Sept. 27, 1938.    T. P. CHASE ET AL    2,131,613
INTERNAL BRAKE
Filed Nov. 25, 1933    2 Sheets-Sheet 2

Inventors
Theron P. Chase &
George E. Martin
By Blackmore, Spencer & Hurd
Attorneys Patented Sept. 27, 1938

2,131,613

UNITED STATES PATENT OFFICE 2,131,613

INTERNAL BRAKE

Theron P. Chase and George E. Martin, Detroit, Mich., assignors, by mesne assignments, to General Motors Corporation, Detroit, Mich., a corporation of Delaware Application November 25, 1933, Serial No. 699,640

9 Claims. (Cl. 188—78)

This invention relates to brakes and has been designed more particularly as an improvement in a brake for use on vehicle wheels.

An object of the invention is to provide a brake in which both shoes do an equal amount of work and, therefore, have a lower maximum pressure per unit area than where one shoe is doing more than the other as in the two-shoe brake with single actuation means.

A further object is to provide a brake having a plurality of shoes which are self-actuating for either direction of drum rotation.

A still further object is to provide an arrangement whereby the pressure of each shoe will balance the pressure of the other and whereby the torque reaction on the supporting structure is balanced.

Other objects and advantages will be understood from the following description.

The invention may be embodied in a brake operated by any suitable hydraulic medium and also in a brake operated by mechanical linkage.

Figure 1:
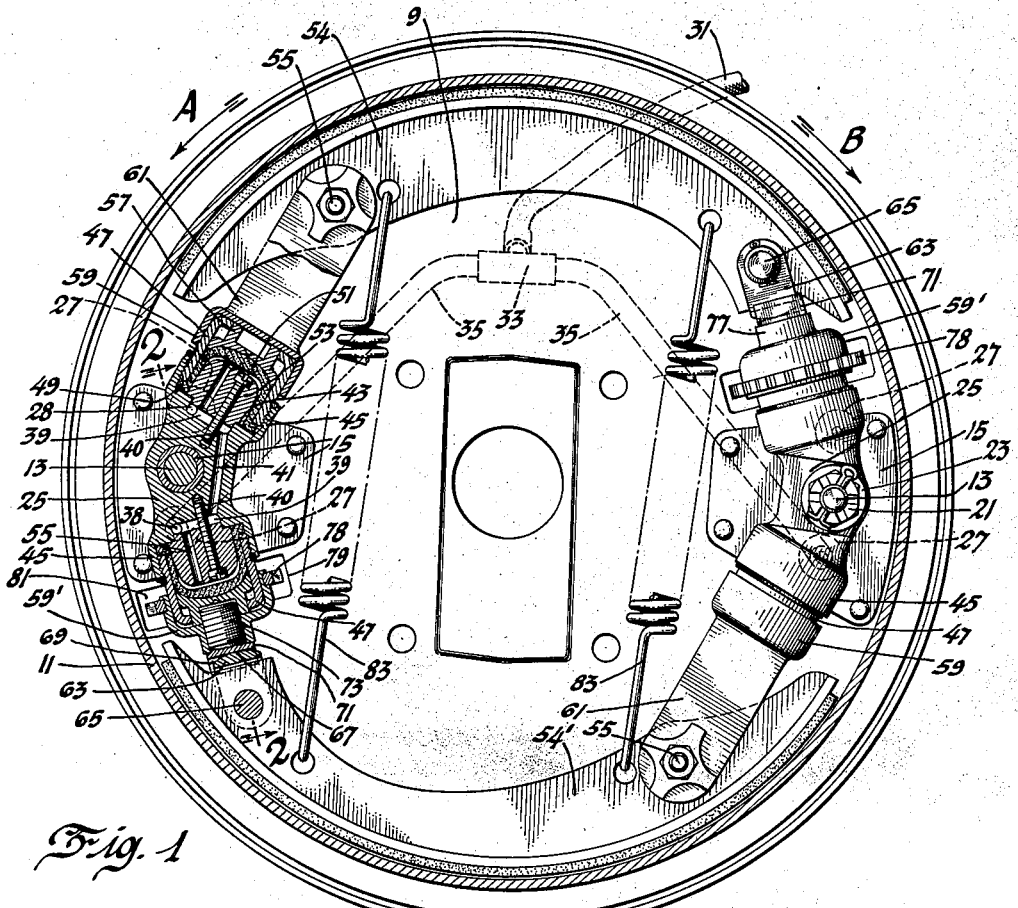
Fig. 1 shows partly in vertical section and partly in elevation one embodiment of the invention.
Figure 2:
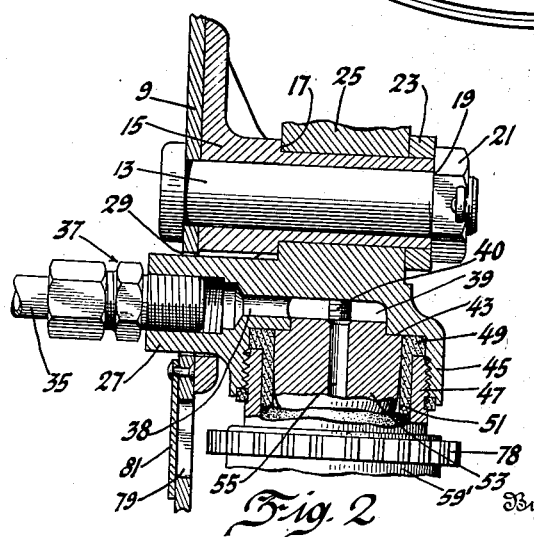
Fig. 2 is a section on line 2—2 of Fig. 1.
Figure 3:
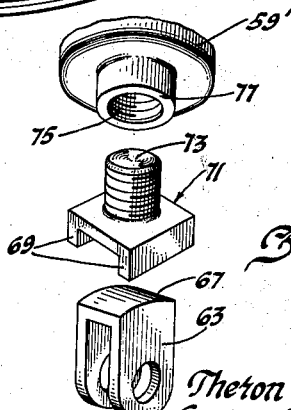
Fig. 3 is a perspective of parts disassembled.

Referring first to Fig. 1, numeral 9 is the relatively fixed backing plate which is carried by the axle, not shown. The drum carried by the wheel is shown in section by numeral 11. At diametrically opposite points are two anchor pins 13. Surrounding each anchor pin is a sleeve 15 having a shoulder 17. The pin 13 is also shouldered at 19, and a nut 21 is threaded on its reduced end. Around the sleeve 15 between the shoulder 17 and a spacer 23 is rotatably supported a double hydraulic wheel cylinder unit 25. This unit has bosses 27 projecting through openings 29 in the backing plate. One of these bosses is shown by Fig. 2. The other boss is shown in dotted lines in Fig. 1. It is above the pivot 13 and has an air bleed passage 28. A conduit 31 from a master cylinder of an hydraulic system is connected by a T 33 with conduits 35. The conduit 35 for each unit 25 is connected by a suitable fitting 37 to an opening in boss 27. This opening communicates by a passage 38 with an open space 39. The two spaces 39 of each unit 25 are connected by a passage 41. These spaces 39 are formed by removing material from below floors 43 formed on the unit 25 from which floors extend circular walls 45. Into each wall 45 is threaded a cup 47. The circumferential edge of the cup clamps the flange 49 of a flexible cup 51 of rubber or the like between itself and the floor 43. To reduce the capacity of the chamber within the rubber cup there may be provided a block 53 shouldered to seat on the edge of the floor 43 surrounding the space 39. The block is secured by fastening means 40. This block is provided with a passage 55 affording communication between space 39 and the region beneath the rubber cup whereby fluid passing through passage 38 and space 39 may push outwardly on the rubber cup. The outward movement of the rubber cup pushes a piston or plunger 57. As shown at the upper left side of Fig. 1, this piston 57 is guided by the inner wall of cup 47. It also is guided by an opening in the otherwise closed end of the cup 47. Axially slidable on the outer wall of cup 47 is a cupped member 59 constituting a part of a link 61 which is pivoted to one of the brake shoes 54 at 55. Preferably at the point of application of force to the other shoe, adjustment is provided. To this end a yoke 63 is carried on a pin 65 at the end of shoe 54'. The yoke has a rounded surface 67 engaging between walls 69 of a member 71 having a threaded stem 73. Stem 73 is threaded into an opening 75 of the extended end 77 of a cup-shaped member 59' slidable along the outer wall of part 47. For turning part 59' there is provided thereon a notched ring 78. The backing plate is shown in Fig. 2 as provided with an opening 79 over which is pivoted a cover 81 which may be turned to give access to the notched ring 78. It will be seen that by rotation of 59' the shoe end may be moved toward or away from the drum surface. A spring 83 has end connections to the two shoe ends whereby the members 59 and 59' are held against the members 47 when the hydraulic pressure is released. The anchor pin 13 together with the parts 25 and 47 thus becomes an anchor means for the shoes. When the hydraulic pressure is applied the members 57 are pushed outwardly, the applied force tending to push the parts 59 and 59' outwardly and thus to force the ends of the shoes against the drum. Precisely the same arrangement is made use of at the other pair of adjacent shoe ends, each shoe having a long link 61 at its heel end for checking forward travel.

It will be seen that for forward travel as shown by arrow A, shoe 54 is self-actuated by drum rotation to an anchorage at its left end against its cooperating part 47 and pin 13. Its right end is applied by hydraulic power so that the shoe is one having an articulated anchorage through the instrumentality of link 61. Similarly shoe 54' anchors at its right end by means of link 61 on opposite pin 13. Hydraulic actuation at its left end makes it too a self-actuating shoe with articulated anchorage. When the shoes are so applied the unit 25 may tend to rotate slightly counterclockwise under the influence of relative rotation between the parts at 55. The relative movement between parts 63 and 71 permits the necessary accommodation and provides that the applied force shall act substantially on a line through 13 and 65. In the case where the brake is applied to check reverse rotation of the drum and wheel, as shown by arrow B, the right end of shoe 54 and the left end of shoe 54' anchor, and the opposite ends are the applied ends. Here, too, both shoes will be seen to be self-actuated and to have an articulated link anchorage. A relatively large area of contact is provided by the two shoes. Since the two shoes are equally dimensioned and since both are similarly self-actuating there is no tendency to displace the drum as when one shoe operates with a force greater than the other. The pressure of each shoe will balance that of the other. Also, the components of the tangential forces acting through the linkage and which components tend to produce translation of the backing plate and axle are equal and opposite. The torque reaction may therefore be said to be balanced.

Figure 4:
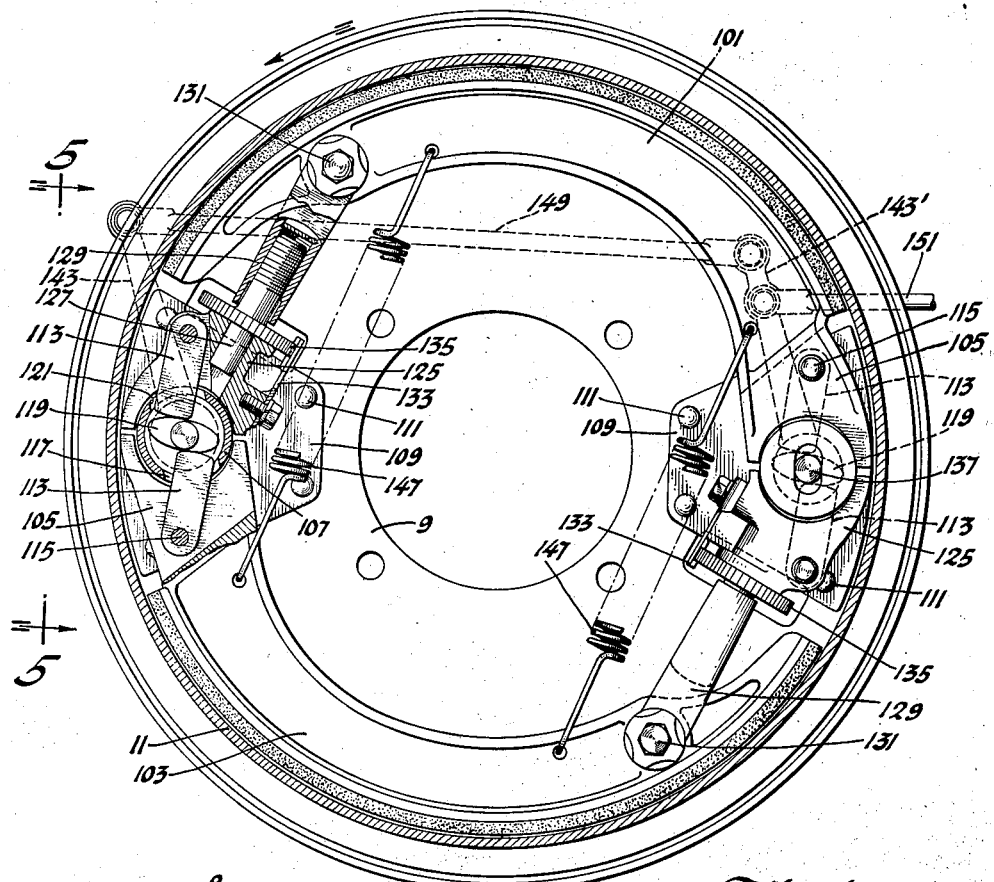
Fig. 4 is a view partly in section and partly in elevation showing a modified form.
Figure 5:
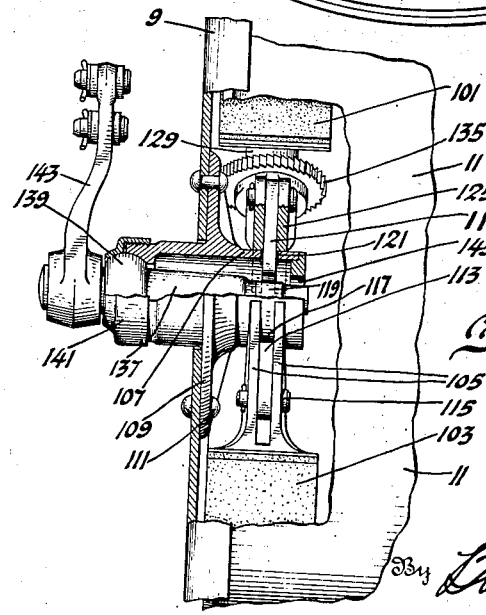
Fig. 5 is a view with parts broken away and in section as seen from line 5—5 of Fig. 4.

In Fig. 4 and Fig. 5 the invention is shown applied to a mechanically-operated brake. Numerals 9 and 11 represent the backing plate and drum as before. The shoes 101 and 103 are disposed in the same manner as are shoes 54 and 54' of the other form. At one end each shoe is provided with a pair of spaced extensions 105 having arcuate ends engaging, when the brake is released, a hollow cylindrical anchor 107 which has a radially enlarged region 109 secured to the anchor plate by fastening means 111. Between the adjacent extensions a roller sector 113 is pivoted as at 115. This sector projects through an opening 117 in the wall of 107 to engage a cam 119 located therein as shown by Fig. 4. Another opening 121 in cylinder 107 receives another cam-engaging sector 113 pivoted to a block 125. This block has spaced extensions embracing the sector, the extensions having arcuate end faces designed to engage the cylindrical anchor 107. Freely mounted within an opening in part 125 is a stem 127. Its outer end is in threaded engagement with a tubular link 129 pivoted to shoe 101 at 131. Secured to block 125 is a yielding finger 133 designed to adjustably engage the notched ring 135 carried by stem 127. By rotating ring 135 which is in abutment with block 125, the link 129 may be moved to provide a greater or lesser clearance between the end of shoe 101 and the drum. The cam 119 is carried on a cam shaft 137, the outer end of which carries a spherical bearing 139 supported in the cup-shaped end of part 107 and a cap 141 threaded thereon. The shaft has an operating lever arm 143. The inner end of the shaft is given some degree of free movement as shown at 145 in Fig. 5. By this arrangement the cam may move to accommodate unequal shoe clearance and to insure an equal division of the applied force to the two shoes. A spring 147 is attached to the two shoes near their ends. This spring holds the shoes in their released position with the arcuate ends seated on the anchorage element 107. A duplicate construction is provided between the other pair of adjacent shoe ends. The cam shaft arm 143' of the other cam 119 may be connected by a link 149 with arm 143 and an operating link 151 attached to arm 143' may be used for rotating the two cams simultaneously. It will be understood that link 151 is to be pulled by any suitable brake hook-up between itself and the pedal or other operating member. Here as before the symmetrical character of the shoes and their equal dimensions enable each to do an equal amount of work with the consequence of avoiding drum distortion. The forces applied by the two cams act tangentially and in opposite directions, constituting a couple acting on the anchor plate but having no tendency to cause translation of the axle which carries the plate. As in the case first described the forward rotation is checked by both shoes acting at their heel end with an articulated anchorage. In this form the reverse rotation operates with each shoe anchored on its own anchor member 107.

We claim:

1. In a brake, a drum, an anchor plate, two equally dimensioned shoes, a single anchor means between each pair of adjacent ends of said shoes, articulating links pivoted to symmetrically opposite ends of said shoes and engaging the adjacent anchor means, means whereby the other ends of said shoes may anchor directly on said anchoring means, movable means cooperating with a part of said anchor means to constitute applying means between both pairs of adjacent ends of the shoes whereby both shoes are self-actuating for either direction of drum rotation; whereby the pressure of the shoes is balanced; and whereby also the torque reaction on the supporting structure is balanced.

2. The invention defined by claim 1, said applying means including a floating cam to equalize the applied pressure between the two shoes.

3. The invention defined by claim 1, said anchor means consisting of tubular members secured to and extending through said anchor plate to rotatably engage said links at the adjacent ends of said shoes, said applying means comprising cam shafts universally mounted at the outer ends of said tubular member and provided with cams, said shoes having roller sectors extended through openings in said tubular members to engage said cams.

4. The invention defined by claim 1, said links formed of relatively movable parts to adjust said shoes relative to the drum.

5. In a brake, a drum, an anchor plate, diametrically opposite anchor means carried by said plate, equally dimensioned shoes symmetrically disposed between said anchor means, an hydraulic wheel brake unit pivoted on each of said anchor means, opposed pistons in said unit mounted to move on axes forming an obtuse angle with each other, and link means pivoted to the adjacent shoe ends and actuated by said pistons.

6. The invention defined by claim 5, one of the links of each pair being mounted to slide axially with its actuating piston and the other having a rocking mounting relative thereto whereby an articulated anchorage is provided for both directions of drum rotation.

7. The invention defined by claim 5, one of said links of each pair being mounted to slide axially with its actuating piston and the other comprising a plurality of parts constructed to provide axial adjustment and relative rocking.

8. In a brake, a drum, an anchor plate, two equally dimensioned shoes, a single anchoring means including as a part thereof an anchor pin, one such anchoring means being positioned between each pair of adjacent ends of said shoes, articulating links pivoted at points on symmetrically opposite ends of said shoes and engageable with said anchoring means, means whereby the other ends of said shoes may anchor directly on said anchoring means, movable means cooperating with a part of said anchor means to constitute applying means between both pairs of adjacent ends, said movable means including a member movable in an axis determined by said anchor pin and the pivot between the shoe and link whereby both shoes are self-actuating for either direction of drum rotation whereby the pressure of the shoes is balanced, and whereby also the torque reaction on the supporting structure is balanced.

9. A brake comprising a pair of floating shoes, two anchors for the ends of the shoes on opposite sides of the brake, connected applying levers acting on the ends of the shoes on opposite sides of the brake and swinging in a plane paralleling the plane of the brake, and an adjustable part at one end of each shoe acting on the corresponding anchor and engaged by the corresponding lever, said parts serving to adjust the brake for wear without disturbing either the anchorage or the operation of the applying levers of the brake.

THERON P. CHASE.
GEO. E. MARTIN.